(12) United States Patent
Yoo (10) Patent No.: US 6,785,333 B2
(45) Date of Patent: Aug. 31, 2004

(54) MOTION VECTOR CODING METHOD

(75) Inventor: Kook-yeol Yoo, Suwon-si (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 119 days.

(21) Appl. No.: 09/863,758

(22) Filed: May 24, 2001

(65) Prior Publication Data

US 2002/0034250 A1 Mar. 21, 2002

Related U.S. Application Data

(60) Provisional application No. 60/206,783, filed on May 24, 2000.

(30) Foreign Application Priority Data

Oct. 6, 2000 (KR) ........................ 2000-58757

(51) Int. Cl.[7] .............................. H04N 7/12
(52) U.S. Cl. ................................. 375/240.16
(58) Field of Search ..................... 375/240.02–240.08, 375/240.12–240.17, 240.24; 382/232, 236; 348/699; H04N 7/12, 7/32

(56) References Cited

U.S. PATENT DOCUMENTS

| | | | |
|---|---|---|---|
| 5,692,063 A | | 11/1997 | Lee et al. |
| 5,905,535 A | | 5/1999 | Kerdranvat |
| 5,978,030 A | | 11/1999 | Jung et al. |
| 6,008,852 A | * | 12/1999 | Nakaya .................. 375/240.16 |
| 6,084,912 A | * | 7/2000 | Reitmeier et al. ...... 375/240.16 |
| 6,275,532 B1 | * | 8/2001 | Hibi et al. .............. 375/240.17 |
| 6,285,804 B1 | * | 9/2001 | Crinon et al. ................ 348/699 |
| 6,366,701 B1 | * | 4/2002 | Chalom et al. ............. 382/236 |
| 6,473,462 B1 | * | 10/2002 | Chevance et al. ..... 375/240.16 |
| 2002/0057741 A1 | * | 5/2002 | Lainema et al. ....... 375/240.16 |
| 2002/0154695 A1 | * | 10/2002 | Cornog et al. ......... 375/240.12 |
| 2003/0035477 A1 | * | 2/2003 | Sekiguchi et al. ..... 375/240.08 |

FOREIGN PATENT DOCUMENTS

| | | |
|---|---|---|
| EP | 0 765 087 A2 | 3/1997 |
| EP | 0 797 357 A2 | 9/1997 |
| EP | 0 921 688 A1 | 6/1999 |
| JP | 09-172644 | 6/1997 |
| JP | 09182082 | 7/1997 |
| JP | 09-182082 | 7/1997 |
| JP | 11-122619 | 4/1999 |

OTHER PUBLICATIONS

A. Sharaf, et al; Signal Processing: Image Communication 14 (1999) 209–227; "Motion compensation using spatial transformations with forward mapping".

M. Ghanbari, et al; Signal Processing: Image Communication 7 (1995) 567–580; "Motion compensation for very low bit–rate video".

* cited by examiner

*Primary Examiner*—Richard Lee
(74) *Attorney, Agent, or Firm*—Sughrue Mion, PLLC

(57) ABSTRACT

A motion vector coding method is provided. The motion vector coding method includes the steps of (a) performing an affine motion estimation to obtain affine motion parameters, (b) converting the affine motion parameters to a predetermined number of translational motion vectors, and (c) coding the difference between the converted translational motion vectors of a current block and the converted translational motion vectors of a previous block. The method allows for low bit generation while maintaining motion estimation performance available from affine motion estimation.

19 Claims, 3 Drawing Sheets

MOTION VECTOR CODING METHOD

This application claims the benefit of priority based on the U.S. Provisional Application No. 60/206,783 filed on May 24, 2000 and claims the benefit of foreign priority under 35 U.S.C. §119 from Korean Patent Application No. 2000-58757 filed on Oct. 6, 2000. Both Provisional Application No. 60/206,783 and Korean Patent Application No. 2000-58757 are incorporated herein by reference.

BACKGROUND OF THE INVENTION

1. Field of the Invention

The present invention relates to a motion vector coding method and an affine motion estimation method, and more particularly, to a motion vector coding method capable of producing a low bit rate bitstream and an affine motion estimation method capable of effectively performing coding on a small block.

2. Description of the Related Art

Recently, the International Telecommunication Union-Terminal Sector (ITU-T) has made efforts to standardize the H.26L protocol for next generation visual telephony. Since standard schemes such as H.261, H.263, and H.263+ that define a motion vector coding method for visual telephony were adopted as an ITU-T standard, technologies based on H. 263++ and Moving Picture Experts Group (MPEG)-4 standard schemes have been developed. Nonetheless, there remains a need for further improving coding efficiency for ultra low speed real-time applications and a short end-to-end delay. That is, it is highly desirable to have an estimation method and a motion vector coding method that provide for an improved frame rate at the same bit rate as that of the coding method of the H.263+ standard, or that significantly reduces a bit rate while maintaining the same image quality as that encoded by the H.263+ compliant coding method.

In one conventional motion estimation method, assuming that the pair (i,j) are the coordinates of a macroblock or a sub-block thereof, an affine motion estimation is performed to represent the motion of a pixel in an image using the following Equations (1a) and (1b):

$$v_X(i, j) = a_0 + a_1 i + a_2 j \tag{1a}$$

$$v_Y(i, j) = a_3 + a_4 i + a_5 j \tag{1b}$$

where $v_X(i,j)$ and $v_Y(i,j)$ are motion magnitude components of the X- and Y-axis directions for a pixel located in the block (i,j). The expression $(v_X(i,j), v_Y(i,j))^T$, consisting of motion magnitude components $v_X(i,j)$ and $v_Y(i,j)$, is referred to as the motion vector of the pixel located at the coordinates (i,j). That is, the motion vector of each pixel is determined by each pixel location and six parameters $(a_0, a_1, a_2, \ldots, a_5)^T$. These parameters $(a_0, a_1, a_2, \ldots, a5)T$ may be called affine motion parameters. However, according to a method of estimating motion using the affine motion parameters, as the number of bits representing the affine motion parameters increases, computation for a motion estimation becomes more complex and takes more time. Furthermore, with respect to some blocks, this affine motion estimation cannot be more effective than conventional translational motion estimation.

Meanwhile, standards such as H.261, H.263, MPEG-1, and MPEG-2 represent the motion of a pixel based on a translational motion model expressed by:

$$v_X(i,j) = t_1 \tag{2a}$$

$$v_Y(i,j) = t_2 \tag{2b}$$

As is evident from Equations (2a) and (2b), the motion vectors of all pixels in a block are fixed as one vector. However, in the case of affine motion, as expressed in Equations (1a) and (1b), a motion vector with respect to each pixel location is variable. The affine motion estimation is capable of representing complex motions that include any or all of translations such as rotation, magnification, reduction and shear, thereby allowing for more precise motion estimation.

To estimate the motion of an image using the affine motion estimation, the affine motion parameters as expressed in Equations (1a) and (1b) must be obtained on a block-by-block basis. The motion parameters correspond to displacements that minimize the difference between pixel values for a present image and a preceding motion-compensated image and are expressed by the following Equation (3):

$$\arg\min_{a_k} \sum_{(i,j) \in M_k} \{I_n(i, j) - I_{n-1}(i + v_X(i, j) + v_Y(i, j)\}^2 \tag{3}$$

where $I_n(i,j)$ denotes the luminance of the pixel at location $(i,j)$, and $M_k$ denotes the $k^{th}$ block. $(v_X(i,j), v_Y(i,j))^T$ is expressed by Equations (1a) and (1b). That is, motion parameters that minimize the luminance difference between a present block and a previous block motion-compensated by the motion parameters are expressed in Equation (3), and the motion parameters are called motion-estimated parameters.

In the affine motion estimation method according to the conventional art, the motion parameters are obtained using the following Equation (4):

$$a_k^{l+1} = a_k^l + u_k^l \tag{4}$$

where the term $a_k^l = (a_0, a_1, a_2, a_3, a_4, a_5)^T$, and l denotes an iteration coefficient.

When l equals 0, the motion parameter is expressed by:

$$a_k^0 = (0,0,0,0,0,0)^T$$

In this case, the motion parameter is called an initial value.

$$u_k^l = \left\{ \sum_{(i,j) \in Mk} \{(h_{ij}^l (h_{ij}^l)^T)\} \right\}^{-1} \left\{ \sum \{(d_n^l(i, j)^T h_{ij}^l\} \right\}$$

$$h_k^l = (G_x^l(i,j), iG_x^l(i,j), jG_x^l(i,j), G_y^l(i,j), iG_y^l(i,j), jG_y^l(i,j))^T$$

$$d_n^l(i,j) = I_n(i,j) - I_{n-1}(i,j)(i + a_0^l + a_1^l i + a_2^l i, j + a_3^l + a_4^l i + a_5^l j) \tag{8}$$

$$G_x^l(i,j) = \{I_n(i+1,j) - I_{n-1}(i,j)(i + a_0^l + a_1^l i + a_2^l j - 1, j + a_3^l + a_4^l i + a_5^l j\}/2 \tag{9a}$$

$$G_y^l(i,j) = \{I_n(i,j+1) - I_{n-1}(i,j)(i + a_0^l + a_1^l i + a_2^l j - 1, j + a_3^l + a_4^l i + a_5^l j - 1\}/2 \tag{9b}$$

The method of estimating the affine motion parameters shown in Equations 4 through 9a and 9b is called a differential motion estimation method. The differential motion estimation method is mostly used in affine motion estimation.

In this case, for affine motion estimation, first, the iteration coefficient 1 is set to "0" and the square error is set at a maximum as possible. Next, the value obtained from Equation (6) is updated using Equations 6 through 9a and 9b, and then the updated value is substituted into Equation (4) to thereby obtain $a_k^{l+1}$. Then, the difference between the present block and the motion-compensated previous block is obtained using the value $a_k^{l+1}$ and the following Equation:

$$SE(l+1) = \sum_{i,j=Mk} \{I_n(i, j) - \tag{10}$$

$$I_{n-1}(i + a_0^{l+1} + a_1^{l+1}i + a_2^{l+1}j, j + a_3^{l+1} + a_4^{l+1}i + a_5^{l+1}j\}$$

If SE(l+1) is less than SE(l), l increases by 1 and the above steps are repeatedly performed. If SE(l+1) is greater than SE(l), $a_k^l$ at that time is determined as an estimated motion parameter, and then repetitions of the motion estimation process are terminated.

However, the affine motion estimation method has a problem in that motion estimation performance for small-sized blocks is significantly degraded. Thus, although the affine motion estimation method exhibits an excellent image prediction over the translational motion estimation method, it cannot be applied to standards such as H.261, H.263, MPEG-1, and MPEG-4.

Meanwhile, the affine motion parameters are real numbers with decimal points. Thus, to use these parameters in actual video coding, they must be converted or quantized to fixed-point numbers.

In standards such as H.261, H.263, MPEG-1, and MPEG-4, to which a translational motion model is applied, motion information to be encoded in each block is predictively encoded using motion vectors, thereby reducing the number of bits generated per unit time in a bitstream during coding of the motion information. However, if an affine motion model is used, since each of the six motion parameters shown in Equations (1a) and (1b) is not affected by neighboring blocks, it is very difficult to predictively encode motion information as employed in the translational motion model. That is, a significantly large number of bits may be required in coding a motion parameter of an affine motion model. Thus, it is highly desirable to have a method of effectively coding affine motion parameters.

SUMMARY OF THE INVENTION

To solve the above problems, it is an objective of the present invention to provide a method of coding a motion vector that reduces a generated bit rate while maintaining motion estimation performance available from an affine motion estimation.

It is another objective of the present invention to provide a method of estimating motion that is capable of effectively performing coding on a small block.

It is still another objective of the present invention to provide a motion vector decoding method for decoding a bitstream encoded by the motion vector coding method.

Accordingly, to achieve the above objectives, the present invention provides a method of coding a motion vector including the steps of (a) performing an affine motion estimation to obtain affine motion parameters, (b) converting the affine motion parameters to a predetermined number of translational motion vectors, and (c) coding the difference between the converted translational motion vectors of a current block and the converted translational motion vectors of a previous block.

The motion vector coding method further includes the step of quantizing the translational motion vectors in the step (b) to fixed-point numbers having a predetermined accuracy prior to the step (c). Furthermore, the motion vector coding method further includes the step of determining a predetermined pixel range for each translational motion vector of the current block and obtaining an accuracy $\Phi$ for each pixel value in the predetermined range, the accuracy $\Phi$ producing the smallest value in $$\min_{\phi \in \Pi} \{MSE(\varphi) + \lambda Bits(\varphi)\}$$

among a set $\Pi$ of accuracies, where QP is a quantization interval used in coding an image, $\lambda$ is a constant determined based on the quantization interval QP, MSE($\Phi$) denotes the mean square sum of a differential signal between the current block and the preceding motion-compensated block when translational motion vectors of the current block are represented with an accuracy $\Phi$, and Bits ($\Phi$) denotes the number of bits used to code the translational motion vector of the current block with an accuracy $\Phi$, prior to the step (c).

The method further includes the step of predicting the converted translational motion vectors of the current block by translational motion vectors of neighboring blocks using $\hat{v}_{X,Ca}$=median$\{V_{X,Cb}, V_{X,Uc}, V_{X,Ud}\}$, $\hat{V}_{Y,Ca}$=median$\{V_{Y,Cb}, V_{Y,Uc}, V_{Y,Ud}\}$, $\hat{V}_{X,Cb}$=median$\{V_{X,Ca}, V_{X,Ud}, V_{X,Dc}\}$ $\hat{V}_{Y,Cb}$=median$\{V_{Y,Ca}, V_{Y,Ud}, V_{Y,Dc}\}$, $\hat{V}_{X,Cc}$=median$\{V_{X,Ld}, v_{X,Ca}, V_{X,Cb}\}$, and $\hat{V}_{Y,Cc}$=median$\{V_{Y,Ld}, V_{Y,Ca}, V_{Y,Cb}\}$, where a hat denotes an operation for obtaining a predicted value and median { } denotes an operation of obtaining the translational motion vector having the median magnitude among the translational motion vectors.

Step (c) includes the steps of: (c-1) calculating the differences between the translational motion vectors of the current block and the blocks neighboring the current block by using the converted translational motion vectors of the current block and the translational motion vectors of the neighboring blocks; and (c-2) performing variable length coding on the obtained differences between the translational motion vectors.

Step (a) includes the step of obtaining six affine motion estimation parameters $(a_0, a_1, a_2, \ldots, a_5)^T$ by estimating the motion of a pixel in an image using pixel values of a block to be encoded in a current frame and pixel values in a preceding frame and using, $v_x(i,j)=a_0+a_1i+a_2j$, and $v_y(i,j)=a_3+a_4i+a_5j$, where the pair (i,j) are the coordinates of a macroblock or a sub-block thereof.

Step (b) includes the step of obtaining motion vectors of the center points of the sub-blocks A, B, C, and D by using $(v_{x,A},v_{Y,A})=(a_0+a_1\alpha+a_2\alpha,a_3+a_4\alpha+a_5\alpha)$, $(v_{x,B},v_{Y,B})=(a_0+3a_1\alpha+a_2\alpha,a_3+3a_4\alpha a_5\alpha)$, and $(v_{x,C},v_{Y,C})=(a_0+a_1\alpha+3a_2\alpha,a_3+a_4\alpha+3a_5\alpha)$ based on $$v_X(i, j) = \frac{1}{2\alpha}(4\alpha - i - j)v_{X,A} +$$

$$\frac{1}{2\alpha}(-2\alpha + i)v_{X,B}\frac{1}{2\alpha}(-2\alpha + j)v_{X,C},$$

$$v_Y(i, j) = \frac{1}{2\alpha}(4\alpha - i - j)v_{Y,A} + \frac{1}{2\alpha}(-2\alpha + i)v_{Y,B} + \frac{1}{2\alpha}(-2\alpha + j)v_{Y,C}.$$

where one macroblock consists of sub-blocks A, B, C, and D, the size of the macroblock is S×S, and the constant $\alpha$ is S/4+1/2.

After step (b), the motion vector coding method further includes the steps of (b'-1) quantizing the converted translational motion vectors to fixed-point numbers having a predetermined accuracy, (b'-2) selecting an optimum accuracy considering a bit rate and distortion among accuracies, with which the translational motion vectors are represented, and (b'-3) predicting translational motion vectors having the selected accuracy using converted translational motion vectors of neighboring blocks.

Prior to step (a), the method further includes the step of obtaining one translational motion vector for the current block by a block matching technique, and step (a) includes the step (a') performing an affine motion estimation using the obtained translational motion vector as an initial value.

Alternatively, prior to step (a), the method further includes the step of obtaining a motion parameter that minimizes the mean square sum of a difference signal between the current block and the motion-compensated previous block among estimated affine motion parameters of blocks located above the current block and located on the left thereof, and step (a) includes the step of (a') performing an affine motion estimation using the obtained motion parameter as an initial value to obtain affine motion parameters for a predetermined pixel range.

The present invention also provides a method of coding a motion vector including the steps of (a) performing an affine motion estimation to obtain affine motion parameters, (b) obtaining translational motion vectors based on $$v_X(i,j) = \frac{1}{2\alpha}(4\alpha - i - j)v_{X,A} +$$
$$\frac{1}{2\alpha}(-2\alpha + i)v_{X,B}\frac{1}{2\alpha}(-2\alpha + j)v_{X,C} \text{ and}$$
$$v_Y(i,j) = \frac{1}{2\alpha}(4\alpha - i - j)v_{Y,A} + \frac{1}{2\alpha}(-2\alpha + i)v_{Y,B} + \frac{1}{2\alpha}(-2\alpha + j)v_{Y,C}.$$

size of a block is S×S, and the constant $\alpha$ is S/4+1/2, and (c) coding the difference between the translational motion vectors obtained in step (b).

The present invention also provides a method of coding a motion vector including the steps of: (a) determining a predetermined pixel range for each translational motion vector of a current block; (b) determining the translational motion vector of a current block for each pixel value in the predetermined range, wherein the pixel motion vector is represented with an accuracy $\Phi$ that produces the smallest value in $$\min_{\varphi \in \Pi}\{MSE(\varphi) + \lambda Bits(\varphi)\}$$

among a set $\Pi$ of accuracies, where QP is a quantization interval used in coding an image, $\lambda$ is a constant determined based on the quantization interval QP, MSE($\Phi$) denotes the mean square sum of a differential signal between the current block and the preceding motion-compensated block when translational motion vectors of the current block are represented with an accuracy $\Phi$, and Bits ($\Phi$) denotes the number of bits used to code the translational motion vector of the current block with an accuracy $\Phi$; and (c) coding the difference between the translational motion vectors of the current block and the translational motion vectors of the previous block.

The present invention also provides a method of coding a motion vector including the steps of:(a) determining a predetermined pixel range for each of six translational motion vector components $\{v_{X,A}, v_{Y,A}, v_{X,B}, v_{Y,B}, v_{X,C}, v_{Y,C}\}$; (b) obtaining the translational motion vector of a current block for each of the pixel values in the predetermined range determined for each of the six translational motion vector components $\{v_{X,A}, v_{Y,A}, v_{X,B}, v_{Y,B}, v_{X,C}, v_{Y,C}\}$ in step (a), wherein the pixel motion vector is represented with an accuracy $\Phi$ that produces the smallest value in $$\min_{\varphi \in \Pi}\{MSE(\varphi) + \lambda Bits(\varphi)\}$$

among a set $\Pi$ of accuracies, where QP is a quantization interval used in coding an image, $\lambda$ is a constant determined based on the quantization interval QP, MSE($\Phi$) denotes the mean square sum of a differential signal between the current block and the preceding motion-compensated block when translational motion vectors of the current block are represented with an accuracy $\Phi$, and Bits ($\Phi$) denotes the number of bits used to code the translational motion vector of the current block with an accuracy $\Phi$; and (c) coding the difference between the translational motion vectors obtained in step (b).

The present invention also provides a motion estimation method including the steps of (a) performing an affine motion estimation to obtain affine motion parameters, and (b) converting the affine motion parameters to a predetermined number of translational motion vectors.

The present invention also provides a method of decoding a motion vector including the steps of (a) receiving encoded data, (b) decoding the received data to obtain translational motion vectors, (c) converting the obtained translational motion vectors to affine motion parameters, and (d) performing motion compensation using the obtained affine motion parameters.

BRIEF DESCRIPTION OF THE DRAWINGS

The above objectives and advantages of the present invention will become more apparent by describing in detail a preferred embodiment thereof with reference to the attached drawings in which.

DETAILED DESCRIPTION OF THE INVENTION

Figure 1:
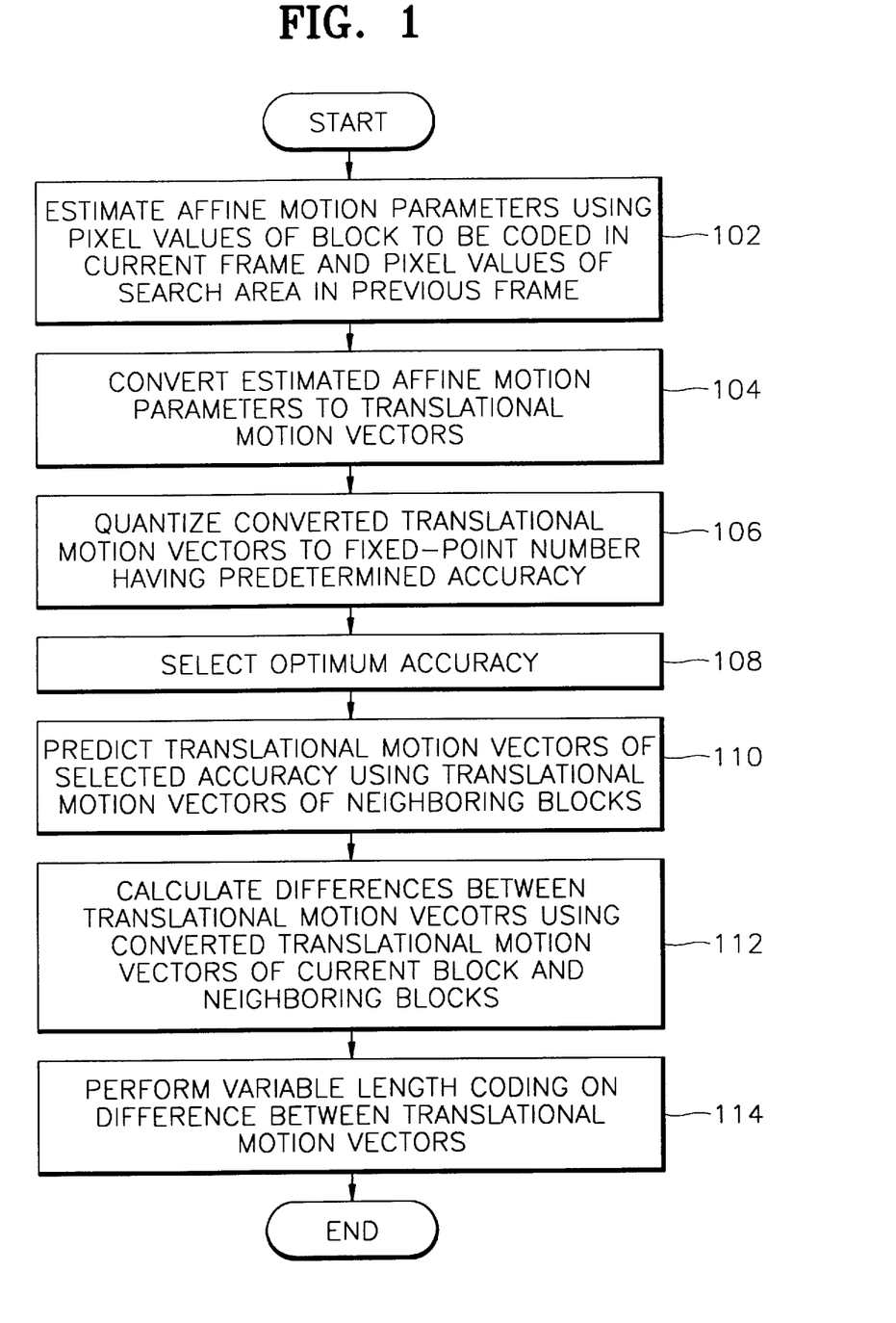
FIG. 1 is a flowchart showing the main steps of a motion vector coding method according to an embodiment of the present invention.

Referring to FIG. 1, according to a method of coding a motion vector according to the present invention, first, pixel values of a block to be coded in a current image frame and pixel values of a search area in a preceding image frame are used to perform an affine motion estimation, thus obtaining affine motion parameters of the current block (step 102). The affine motion estimation may be described using six parameters, for example, $a_0$, $a_1$, $a_2$, $a_3$, $a_4$, and $a_5$. In this embodiment, the affine motion is described using three translational motion vectors. For this purpose, next, the affine motion parameters obtained by performing the motion estimation are converted to translational motion vectors (step 104). In step 104, assuming that the size of the current block and a constant $\alpha$ are defined as S×S, and S/4+1/2, respectively, the affine motion parameters are converted to translational motion vectors based on the following Equations (11a) and (11b):

$$v_X(i, j) = \frac{1}{2\alpha}(4\alpha - i - j)v_{X,A} + \qquad (11a)$$
$$\frac{1}{2\alpha}(-2\alpha + i)v_{X,B} \frac{1}{2\alpha}(-2\alpha + j)v_{X,C}$$

$$v_Y(i, j) = \frac{1}{2\alpha}(4\alpha - i - j)v_{Y,A} + \frac{1}{2\alpha}(-2\alpha + i)v_{Y,B} + \qquad (11b)$$
$$\frac{1}{2\alpha}(-2\alpha + j)v_{Y,C}$$

Since the affine motion parameters are real numbers with decimal points, they are converted or quantized to fixed-point numbers so as to be used in actual motion vector coding. For this purpose, the translational motion vectors converted in step 104 are quantized to fixed-point values having a predetermined accuracy (step 106).

Figure 2:
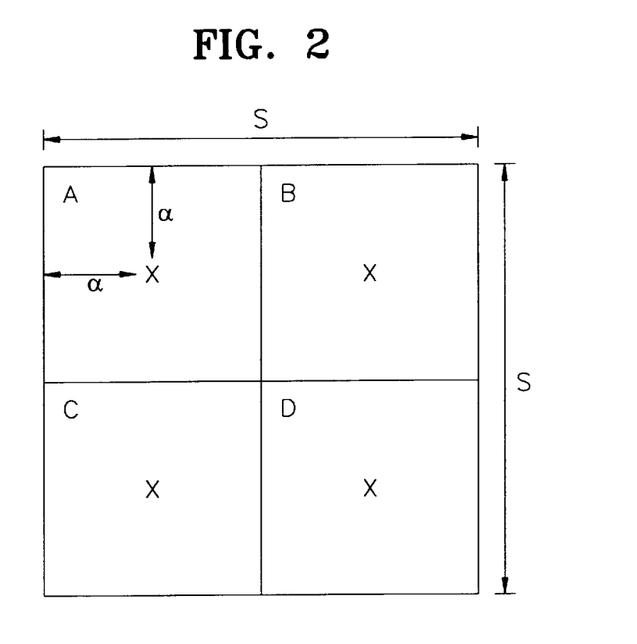
FIG. 2 shows the coordinate system of an affine motion vector used in a motion estimation method according to an embodiment of the present invention.

Assuming that the current block consists of four sub-blocks A, B, C, and D as shown in FIG. 2, if the coordinate values of the center points of the sub-blocks A, B, C and D are substituted into the coordinates i and j of Equations (1a) and (1b), the motion vectors of the center points of the sub-blocks A, B, C, and D can be obtained as follows:

$$[v_{X,A}, v_{Y,A}] = [a_0 + a_1\alpha + a_2\alpha, a_3 + a_4\alpha + a_5\alpha] \qquad (12a)$$

$$[v_{X,B}, v_{Y,B}] = [a_0 + 3a_1\alpha + a_2\alpha, a_3 + 3a_4\alpha + a^5\alpha] \qquad (12b)$$

$$[v_{X,C}, v_{Y,C}] = [a_0 + a_1\alpha + 3a_2\alpha, a_3 + a_4\alpha + 3a_5\alpha] \qquad (12c)$$

Next, an optimum accuracy is selected (step 108) based on:

$$\min_{\varphi \in \Pi}\{MSE(\varphi) + \lambda Bits(\varphi)\} \qquad (13)$$

where $\Phi$ and $\Pi$ are a selected accuracy and a set of accuracies, respectively. Furthermore, $\lambda$ is set to 0.85 $QP^2$ assuming that QP is a quantization interval used in coding an image. MSE($\Phi$) denotes the mean square sum of a differential signal between the current block and a preceding motion-compensated block when translational motion vectors of the current block are represented with the accuracy $\Phi$. Bits($\Phi$) denotes the number of bits used to code the translational motion vectors of the current block with the accuracy $\Phi$. Thus, the optimum accuracy means accuracy $\Phi$, which produces the smallest value in Equation (13) among the set $\Pi$ of accuracies. The translational motion vectors of the current block are represented with the optimum accuracy.

Next, the converted translational motion vectors of the current block are predicted using translational motion vectors of neighboring blocks, by the following Equations (step 110):

$$\hat{v}_{X,Ca} = \text{median}\{v_{X,Cb}, v_{X,Uc}, v_{X,Ud}\} \qquad (14a)$$

$$\hat{v}_{Y,Ca} = \text{median}\{v_{Y,Cb}, v_{Y,Uc}, v_{Y,Ud}\} \qquad (14b)$$

$$\hat{v}_{X,Cb} = \text{median}\{v_{X,Ca}, v_{X,Ud}, v_{X,Dc}\} \qquad (15a)$$

$$\hat{v}_{Y,Cb} = \text{median}\{v_{Y,Ca}, v_{Y,Ud}, v_{Y,Dc}\} \qquad (15b)$$

$$\hat{v}_{X,Cc} = \text{median}\{v_{X,Ld}, v_{X,Ca}, v_{X,Cb}\} \qquad (16a)$$

$$\hat{v}_{Y,Cc} = \text{median}\{v_{Y,Ld}, v_{Y,Ca}, v_{Y,Cb}\} \qquad (16b)$$

Figure 3:
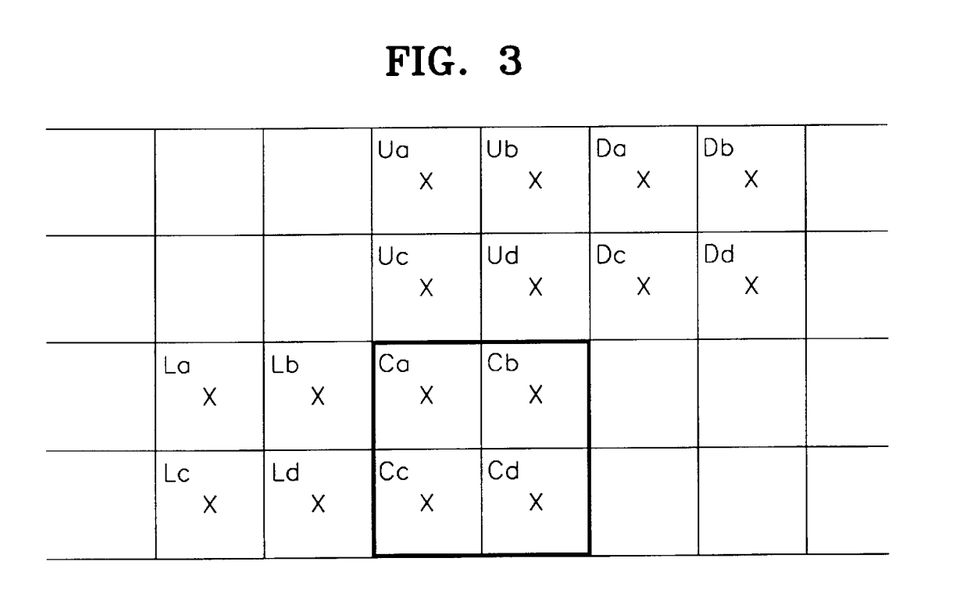
FIG. 3 shows the codes of blocks.

In association therewith, FIG. 3 shows the codes of the blocks. In Equations (16a) and (16b), a hat denotes an operation for obtaining a predicted value, and median { } denotes an operation of obtaining a translational motion vector having a median magnitude among three translational motion vectors. Since the affine motion parameters are represented using the three translational motion vectors as expressed in Equations (11a) and (11b), the translational motion vector of a sub-block at the lower right of the current block, for example, a sub-block "d" may not be predicted nor encoded. Thus, sub-blocks of all blocks at the lower right may not be encoded. However, as expressed in Equations 14a through 16b, the translational motion vectors of sub-blocks Ud and Ld are used in predicting the converted translational motion vectors of the current block. The translational motion vector of the sub-block "d" is calculated using the following Equations (17a) and (17b):

$$v_{X,Ud} = v_{X,Ub} + v_{X,Uc} - v_{X,Ua} \qquad (17a)$$

$$v_{Y,Ud} = v_{Y,Ub} + v_{Y,Uc} - v_{Y,Ua} \qquad (17b)$$

Furthermore, if an accuracy for the translational motion vectors of the neighboring blocks in the Equations 14a through 16b is different from the accuracy for the translational motion vectors of the current block, the former is preferably revised to be the same as the latter.

Next, the difference between translational motion vectors is calculated using the converted translational motion vectors of the current block and the translational motion vectors of the neighboring blocks (step 112), and variable length coding is performed on the calculated translational motion vector difference (step 114).

TABLE 1

| Test image sequence | Format | Translational motion vector | Affine motion vector |
|---|---|---|---|
| Foreman | QCIF, 10 Hz | 7.35 | 9.03 |
| Container | QCIF, 10 Hz | 2.79 | 4.72 |
| News | QCIF, 10 Hz | 4.14 | 6.30 |
| Silent | QCIF, 15 Hz | 4.43 | 7.16 |
| Paris | CIF, 15 Hz | 4.58 | 5.42 |
| Mobile | CIF, 30 Hz | 4.08 | 6.22 |
| Tempete | CIF, 10 Hz | 5.25 | 9.62 |

Table 1 contains the results of evaluating an average motion vector entropy using test images in a motion vector coding method according to an embodiment of the present invention. As is evident from Table 1, the average motion vector entropy for test image sequences when the motion vector coding method according to the present invention based on an affine motion estimation is applied is greater than that for test image sequences when a conventional motion vector coding method based on a translational motion vector estimation is applied.

TABLE 2

| Test image sequence | Format | 16 × 16 block matching | 8 × 8 block matching | Present invention |
|---|---|---|---|---|
| Foreman | QCIF, 10 Hz | 29.34 | 31.58 | 32.37 |
| Container | QCIF, 10 Hz | 38.31 | 39.01 | 39.93 |
| News | QCIF, 10 Hz | 31.52 | 33.38 | 33.93 |
| Silent | QCIF, 15 Hz | 33.53 | 35.45 | 35.98 |
| Paris | CIF, 15 Hz | 31.04 | 32.49 | 32.52 |
| Mobile | QCIF, 30 Hz | 26.85 | 28.14 | 28.62 |
| Tempete | QCIF, 10 Hz | 28.48 | 29.59 | 29.69 |

Furthermore, Table 2 shows the results of measuring a peak-signal-to-noise ratio (PSNR) indicating an average prediction gain, which is expressed in decibels (dB). As is evident from Table 2, the PSNR measured for test image sequences when the motion vector coding method based on the affine motion estimation is applied is greater than that measured for test image sequences when the conventional motion vector coding method based on the translational motion vector estimation is applied.

That is, if a method including the steps 102 and 104 is applied as a motion estimation method for calculating a translational motion vector, high performance motion estimation is performed on small blocks whose dimensions are less than 16 by 16 (16×16) pixel blocks while maintaining improved motion estimation performance available from an affine motion estimation.

Furthermore, the motion vector coding method according to the present invention allows for bit generation ranging from 9.62×3 or 28.86 bits at the high end to 4.72×3 or 14.16 bits at the low end, thus reducing the bit rate compared to a conventional method in which 6×6 or 36 bits are generated during fixed length coding (FLC) of each affine parameter using 8 bits.

In the above embodiment described with reference to FIG. 1, step 102 of performing an affine motion estimation using pixel values of a current block to be coded in a current image frame and of a search region in a preceding image frame to obtain affine motion parameters of the current block, the step 104 of converting the affine motion parameter to translational motion vectors, and the step 106 of quantizing the converted translational motion vectors to fixed-point numbers having a predetermined accuracy are preformed in a separate manner.

However, the above two steps 102 and 104 can be integrated into one step by performing an affine parameter estimation based on the Equations (11a) and (11b), which reduces the complexity of the overall process.

Alternatively, the above three steps 102, 104 and 106 may be integrated into one step by determining a predetermined pixel range for each translational motion vector of the current block and then determining the translational motion vector for each pixel value in the predetermined range, the pixel motion vector being represented with an accuracy that produces the smallest value in Equation (13). For example, it is possible to determine a predetermined subpixel range and then to determine a subpixel motion vector of the translational motion vector for each subpixel value in the predetermined range, the subpixel motion vector being obtained with an accuracy that produces the smallest value in Equation (13). In this case, the complexity of the process is further reduced.

Furthermore, in step 102 in the embodiment described with reference to FIG. 1, each translational motion vector component is obtained considering all variable factors that the component may have. However, it is possible to determine a predetermined range of pixels for each of six translational motion vector components $\{v_{X,A}, v_{Y,A}, v_{X,B}, v_{Y,B}, v_{X,C}, v_{Y,C}\}$ and to determine a pixel motion vector of the translational motion vector for each pixel value in the predetermined range, the translational motion vector being obtained with an accuracy that gives the smallest value in Equation (13).

Furthermore, in step 102, an initial value is set to "0" as expressed by Equation (5). However, it is preferable to perform step 102 by using one translational motion vector, which is obtained by means of a block matching algorithm for the current block, as the initial value. Furthermore, it is possible to use a motion parameter which minimizes the mean square sum of the difference signal between the current block and the preceding motion-compensated block among the estimated affine motion parameters of blocks located above the current block and located on the left thereof.

Furthermore, it is possible to reduce the complexity by obtaining one translational motion vector for the current block by a block matching algorithm and then using the obtained translational motion vector as the initial value to obtain the affine motion parameters for a predetermined pixel range in step 102.

Furthermore, it is possible to further reduce the complexity by obtaining a motion parameter that minimizes the mean square sum of a difference signal between the current block and the preceding motion-compensated block among the estimated affine motion parameters of blocks located above the current block and located on the left thereof, and then using the obtained motion parameter as an initial value to obtain affine motion parameters for a predetermined pixel range in the step 102.

Figure 4:
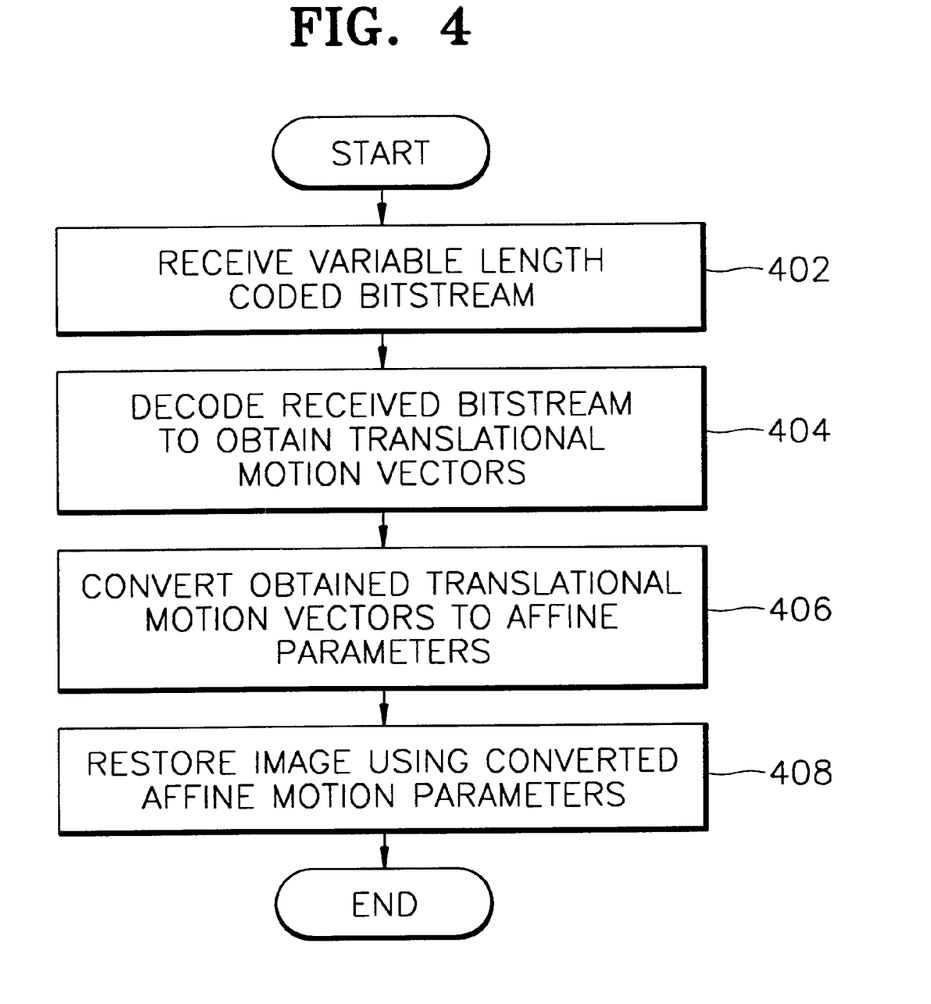
FIG. 4 is a flowchart showing the main steps of a motion vector coding method according to the present invention.

Meanwhile, it is possible to decode a bitstream encoded using the motion vector coding method according to the present invention by motion vector decoding according to the present invention. FIG. 4 is a flowchart showing the main steps of motion vector decoding according to an embodiment of the present invention. Referring to FIG. 4, during the motion vector decoding according to the present invention, variable length coded data is received (step 402), and then the received data is variable length decoded to obtain translational motion vectors (step 404). The bit stream encoded by the motion vector coding method contains the difference between median values of translational motion vectors of a corresponding block and its neighboring blocks. Thus, after performing variable length decoding on the received data to obtain the difference between the median values of the corresponding block and the neighboring blocks, the translational motion vectors are obtained using the difference.

Next, the obtained translational motion vectors are converted to affine motion parameters (step 406). The step 406 is a reverse process of the step of converting the motion parameters to the motion vectors described with reference to FIGS. 1 and 2, and thus a detailed explanation is omitted. Then, motion compensation is performed using the affine motion parameters obtained in step 406 to restore an image (step 408).

Furthermore, the motion vector coding method, the motion estimation method, and motion vector decoding according to the present invention can be written as a program executed on a personal or server computer. The program codes and code segments constructing the program can be easily inferred by computer programmers in the industry. Furthermore, the program can be stored in a computer-readable recording medium. The recording medium includes, among other things, a magnetic recording medium, an optical recording medium, and a radio medium.

As described above, the motion vector coding method according to the present invention allows for a low bit generation while maintaining improved motion estimation performance that can be obtained by using an affine motion estimation. Furthermore, the motion vector coding method according to the present invention is capable of performing high performance motion estimation on small blocks whose dimensions are less than a 16×16 pixel block.

What is claimed is:

1. A method of coding a motion vector comprising the steps of:

(a) performing an affine motion estimation to obtain affine motion parameters;

(b) converting the affine motion parameters to a predetermined number of translational motion vectors; and (c) coding the difference between the converted translational motion vectors of a current block and the converted translational motion vectors of a previous block, prior to step (c), further comprising the step of quantizing the translational motion vectors in step (b) to fixed-point numbers having a predetermined accuracy further comprising the step of determining a predetermined pixel range for each translational motion vector of the current block and obtaining an accuracy $\Phi$ for each pixel value in the predetermined pixel range, the accuracy $\Phi$ producing the smallest value in $$\min_{\varphi \in \Pi}\{MSE(\varphi) + \lambda Bits(\varphi)\}$$

among a set $\Pi$ of accuracies, where QP is a quantization interval used in coding an image, $\lambda$ is a constant determined based on the quantization interval QP, $MSE(\Phi)$ denotes the mean square sum of a differential signal between the current block and a preceding motion-compensated block when translational motion vectors of the current block are represented with an accuracy $\Phi$, and Bits ($\Phi$) denotes the number of bits used to code the translational motion vector of the current block with an accuracy $\Phi$.

2. The method of claim 1, further comprising the step of predicting the converted translational motion vectors of the current block by translational motion vectors of neighboring blocks using, $$\hat{v}_{X,Ca}=\text{median}\{v_{X,Cb}, v_{X,Uc}, v_{X,Ud}\},$$

$$\hat{v}_{Y,Ca}=\text{median}\{v_{Y,Cb}, v_{Y,Uc}, v_{Y,Ud}\}$$

$$\hat{v}_{X,Cb}=\text{median}\{v_{X,Ca}, v_{X,Ud}, v_{X,Dc}\}$$

$$\hat{v}_{Y,Cb}=\text{median}\{v_{Y,Ca}, v_{Y,Ud}, v_{Y,Dc}\},$$

$$\hat{v}_{X,Cc}=\text{median}\{v_{X,Ld}, v_{X,Ca}, v_{X,Cb}\},$$

and $$\hat{v}_{Y,Cc}=\text{median}\{v_{Y,Ld}, v_{Y,Ca}, v_{Y,Cb}\},$$

where a hat denotes an operation for obtaining a predicted value and median { } denotes an operation for obtaining the translational motion vector having the median magnitude among the translational motion vectors.

3. A method of coding a motion vector comprising the steps of:

(a) performing an affine motion estimation to obtain affine motion parameters;

(b) converting the affine motion parameters to a predetermined number of translational motion vectors; and (c) coding the difference between the converted translational motion vectors of a current block and the converted translational motion vectors of a previous block, wherein step (c) comprises the steps of:

(c-1) calculating the differences between the translational motion vectors of the current block and the blocks neighboring the current block by using the converted translational motion vectors of the current block and the translational motion vectors of the neighboring blocks; and (c-2) performing variable length coding on the obtained differences between the translational motion vectors.

4. A method of coding a motion vector comprising the steps of:

(a) performing an affine motion estimation to obtain affine motion parameters;

(b) converting the affine motion parameters to a predetermined number of translational motion vectors; and (c) coding the difference between the converted translational motion vectors of a current block and the converted translational motion vectors of a previous block, wherein step (b) comprises the step of obtaining motion vectors of the center points of the sub-blocks A, B, C, and D by using $(v_{x,A}, v_{Y,A})=(a_0+a_1\alpha+a_2\alpha,a_3+a_4\alpha+a_5\alpha)$, $(v_{x,B}, v_{Y,B})=(a_0+3a_1\alpha+a_2\alpha,a_3+3a_4\alpha+a_5\alpha)$, and $(v_{x,C}, v_{Y,C})=(a_0+a_1\alpha+3a_2\alpha,a_3+a_4\alpha+3a_5\alpha)$ based on $$v_X(i, j) = \frac{1}{2\alpha}(4\alpha - i - j)v_{X,A} +$$
$$\frac{1}{2\alpha}(-2\alpha + i)v_{X,B}\frac{1}{2\alpha}(-2\alpha + j)v_{X,C},$$
$$v_Y(i, j) = \frac{1}{2\alpha}(4\alpha - i - j)v_{Y,A} + \frac{1}{2\alpha}(-2\alpha + i)v_{Y,B} +$$
$$\frac{1}{2\alpha}(-2\alpha + j)v_{Y,C},$$

where one macroblock consists of sub-blocks A, B, C, and D, the size of the macroblock is S×S, and the constant $\alpha$ is S/4+1/2.

5. A method of coding a motion vector comprising the steps of:

(a) performing an affine motion estimation to obtain affine motion parameters;

(b) converting the affine motion parameters to a predetermined number of translational motion vectors; and (c) coding the difference between the converted translational motion vectors of a current block and the converted translational motion vectors of a previous block, after step (b), further comprising the steps of:

(b'-1) quantizing the converted translational motion vectors to fixed-point numbers having a predetermined accuracy;

(b'-2) selecting an optimum accuracy considering a bit rate and distortion among accuracies, with which the translational motion vectors are represented; and (b'-3) predicting translational motion vectors having the selected accuracy using converted translational motion vectors of neighboring blocks.

6. A method of coding a motion vector comprising the steps of:

(a) performing an affine motion estimation to obtain affine motion parameters;

(b) converting the affine motion parameters to a predetermined number of translational motion vectors; and (c) coding the difference between the converted translational motion vectors of a current block and the converted translational motion vectors of a previous block, prior to step (a), further comprising the step of obtaining a motion parameter that minimizes the mean square sum of a difference signal between the current block and a motion-compensated previous block among estimated affine motion parameters of blocks located above the current block and located on the left thereof, wherein step (a) comprises the step of (a') performing an affine motion estimation using the obtained motion parameter as an initial value to obtain affine motion parameters for a predetermined pixel range.

7. A method of coding a motion vector comprising the steps of:

(a) performing an affine motion estimation to obtain affine motion parameters;

(b) obtaining translational motion vectors based on $$v_X(i, j) = \frac{1}{2\alpha}(4\alpha - i - j)v_{X,A} +$$

$$\frac{1}{2\alpha}(-2\alpha + i)v_{X,B}\frac{1}{2\alpha}(-2\alpha + j)v_{X,C}, \text{ and}$$

$$v_Y(i, j) = \frac{1}{2\alpha}(4\alpha - i - j)v_{Y,A} + \frac{1}{2\alpha}(-2\alpha + i)v_{Y,B} + \frac{1}{2\alpha}(-2\alpha + j)v_{Y,C}.$$

where the size of a block is S×S, and the constant α is S/4+1/2; and (c) coding the difference between the translational motion vectors obtained in step (b).

8. The method of claim 7, prior to the step (c), further comprising the step of quantizing the translational motion vectors obtained in the step (b) to fixed-point numbers having a predetermined accuracy.

9. The method of claim 7, prior to step (c), further comprising the step of determining a predetermined pixel range for each translational motion vector of a current block and obtaining an accuracy Φ for each pixel value in the predetermined pixel range, the accuracy Φ producing the smallest value in $$\min_{\varphi \in \Pi}\{MSE(\varphi) + \lambda Bits(\varphi)\}$$

among a set Π of accuracies, where QP is a quantization interval used in coding an image, λ is a constant determined based on the quantization interval QP, MSE(Φ) denotes the mean square sum of a differential signal between the current block and the preceding motion-compensated block when translational motion vectors of the current block are represented with an accuracy Φ, and Bits (Φ) denotes the number of bits used to code the translational motion vector of the current block with an accuracy Φ.

10. The method of claim 7, further comprising the step of predicting the converted translational motion vectors of the current block by translational motion vectors of neighboring blocks using $$\hat{v}_{X,Ca}=\text{median}\{v_{X,Cb}, v_{X,Uc}, v_{X,Ud}\}, \hat{v}_{Y,Ca}=\text{median}\{v_{Y,Cb}, v_{Y,Uc}, v_{Y,Ud}\},$$

$$\hat{v}_{X,Cb}=\text{median}\{v_{X,Ca}, v_{X,Ud}, v_{X,Dc}\}, \hat{v}_{Y,Cb}=\text{median}\{v_{Y,Ca}, v_{Y,Ud}, v_{Y,Dc}\},$$

$$\hat{v}_{X,Cc}=\text{median}\{v_{X,Ld}, v_{X,Ca}, v_{X,Cb}\} \text{ and } \hat{v}_{Y,Cc}=\text{median}\{v_{Y,Ld}, v_{Y,Ca}, v_{Y,Cb}\},$$

where a hat denotes an operation for obtaining a predicted value and median { } denotes an operation of taking the translational motion vector having the median magnitude among the translational motion vectors.

11. The method of claim 7, wherein step (c) comprises the steps of:

(c-1) calculating the differences between the translational motion vectors of the current block and the blocks neighboring the current block by using converted translational motion vectors of the current block and translational motion vectors of the neighboring blocks; and (c-2) performing variable length coding on the obtained differences between the translational motion vectors.

12. A method of coding a motion vector comprising the steps of:

(a) determining a predetermined pixel range for each translational motion vector of a current block;

(b) determining the translational motion vector of a current block for each pixel value in the predetermined pixel range, wherein a pixel motion vector is represented with an accuracy Φ that produces the smallest value in $$\min_{\varphi \in \Pi}\{MSE(\varphi) + \lambda Bits(\varphi)\}$$

among a set Π of accuracies, where QP is a quantization interval used in coding an image, λ is a constant determined based on the quantization interval QP, MSE(Φ) denotes that mean square sum of a differential signal between the current block and a preceding motion-compensated block when translational motion vectors of the current block are represented with an accuracy Φ, and Bits (Φ) denotes the number of bits used to code the translational motion vector of the current block with an accuracy Φ; and (c) coding the difference between the translational motion vectors of the current block and the translational motion vectors of the previous block.

13. The method of claim 12, prior to the step (c), further comprising the step of predicting the converted translational motion vectors of the current block by translational motion vectors of neighboring blocks using $$\hat{v}_{X,Ca}=\text{median}\{v_{X,Cb}, v_{X,Uc}, v_{X,Ud}\}, \hat{v}_{Y,Ca}=\text{median}\{v_{Y,Cb}, v_{Y,Uc}, v_{Y,Ud}\},$$

$$\hat{v}_{X,Cb}=\text{median}\{v_{X,Ca}, v_{X,Ud}, v_{X,Dc}\}, \hat{v}_{Y,Cb}=\text{median}\{v_{Y,Ca}, v_{Y,Ud}, v_{Y,Dc}\},$$

$$\hat{v}_{X,Cc}=\text{median}\{v_{X,Ld}, v_{X,Ca}, v_{X,Cb}\}, \hat{v}_{Y,Cc}=\text{median}\{v_{Y,Ld}, v_{Y,Ca}, v_{Y,Cb}\},$$

where a hat denotes an operation for obtaining a predicted value and median { } denotes an operation of taking the translational motion vector having the median magnitude among the translational motion vectors.

14. The method of claim 12, wherein step (c) comprises the steps of:

(c-1) calculating the differences between the translational motion vectors of the current block and the blocks neighboring the current block by using the converted translational motion vectors of the current block and translational motion vectors of the neighboring blocks; and (c-2) performing variable length coding on the obtained differences between the translational motion vectors.

15. A method of coding a motion vector comprising the steps of:

(a) determining a predetermined pixel range for each of six translational motion vector components $\{v_{X,A}, v_{Y,A}, v_{X,B}, v_{Y,B}, v_{X,C}, v_{Y,C}\}$;

(b) obtaining the translational motion vector of a current block for each pixel values in the predetermined range determined for each of the six translational motion vector components $\{v_{X,A}, v_{Y,A}, v_{X,B}, v_{Y,B}, v_{X,C}, v_{Y,C}\}$ in step (a), wherein a pixel motion vector is represented with an accuracy Φ that produces the smallest value in $$\min_{\varphi \in \Pi}\{MSE(\varphi) + \lambda Bits(\varphi)\}$$

among a set Π of accuracies, where QP is a quantization interval used in coding an image, λ is a constant determined based on the quantization interval QP, MSE($\Phi$) denotes the mean square sum of a differential signal between the current block and the preceding motion-compensated block when translational motion vectors of the current block are represented with an accuracy $\Phi$, and Bits ($\Phi$) denotes the number of bits used to code the translational motion vector of the current block with an accuracy $\Phi$ and (c) coding the difference between the translational motion vectors obtained in step (b).

16. The method of claim 15, prior to step (c), further comprising the step of predicting converted translational motion vectors of the current block by translational motion vectors of neighboring blocks using $\hat{v}_{X,Ca}$=median$\{v_{X,Cb}, v_{X,Uc}, v_{X,Ud}\}$, $\hat{v}_{Y,Ca}$=median$\{v_{Y,Cb}, v_{Y,Uc}, v_{Y,Ud}\}$, $\hat{v}_{X,Cb}$=median$\{v_{X,Ca}, v_{X,Ud}, v_{X,Dc}\}$, $\hat{v}_{Y,Cb}$=median$\{v_{Y,Ca}, v_{Y,Ud}, v_{Y,Dc}\}$, $\hat{v}_{X,Cc}$=median$\{v_{X,Ld}, v_{X,Ca}, v_{X,Cb}\}$, $\hat{v}_{Y,Cc}$=median$\{v_{Y,Ld}, v_{Y,Ca}, v_{Y,Cb}\}$, where a hat denotes an operation for obtaining a predicted value and median { } denotes an operation of taking the translational motion vector having the median magnitude among the translational motion vectors.

17. The method of claim 15, wherein step (c) comprises the steps of:

(c-1) calculating the differences between the translational motion vectors of the current block and the blocks neighboring the current block by using converted translational motion vectors of the current block and translational motion vectors of the neighboring blocks; and (c-2) performing variable length coding on the obtained differences between the translational motion vectors.

18. A motion estimation method comprising the steps of:

(a) performing an affine motion estimation to obtain affine motion parameters; and (b) converting the affine motion parameters to a predetermined number of translational motion vectors, after step (b), further comprising the step of quantizing the translational motion vectors converted in step (b) to fixed-point numbers having a predetermined accuracy, and after step (b), further comprising the step of determining a predetermined pixel range for each translational motion vector of a current block and obtaining an accuracy $\Phi$ for each pixel value in the predetermined pixel range, the accuracy $\Phi$ producing the smallest value in $$\min_{\varphi \in \Pi}\{MSE(\varphi) + \lambda Bits(\varphi)\}$$

among a set $\Pi$ of accuracies, where QP is an quantization interval used in coding an image, $\lambda$ is a constant determined based on the quantization interval QP, MSE ($\Phi$) denotes the mean square sum of a differential signal between the current block and a preceding motion-compensated block when translational motion vectors of the current block are represented with an accuracy $\Phi$, and Bits ($\Phi$) denotes the number of bits used to code the translational motion vector of the current block with an accuracy $\Phi$.

19. The method of claim 18, further comprising the step of predicting converted translational motion vectors of the current block by translational motion vectors of neighboring blocks using, $\hat{v}_{X,Ca}$=median$\{v_{X,Cb}, v_{X,Uc}, v_{X,Ud}\}$, $\hat{v}_{Y,Ca}$=median$\{v_{Y,Cb}, v_{Y,Uc}, v_{Y,Ud}\}$, $\hat{v}_{X,Cb}$=median$\{v_{X,Ca}, v_{X,Ud}, v_{X,Dc}\}$, $\hat{v}_{Y,Cb}$=median$\{v_{Y,Ca}, v_{Y,Ud}, v_{Y,Dc}\}$, $\hat{v}_{X,Cc}$=median$\{v_{X,Ld}, v_{X,Ca}, v_{X,Cb}\}$, and $\hat{v}_{Y,Cc}$=median$\{v_{Y,Ld}, v_{Y,Ca}, v_{Y,Cb}\}$, where a hat denotes an operation for obtaining a predicted value and median { } denotes an operation of taking the translational motion vector having the median magnitude among the translational motion vectors.

* * * * *

UNITED STATES PATENT AND TRADEMARK OFFICE
CERTIFICATE OF CORRECTION

PATENT NO. : 6,785,333 B2
DATED : August 31, 2004
INVENTOR(S) : Kook-yeol Yoo

It is certified that error appears in the above-identified patent and that said Letters Patent is hereby corrected as shown below:

Title page,
Item [*] Notice, "Subject to any disclaimer, ther term of this patent is extended or adjusted under 35 U.S.C. 154(b) by 119 days." should read -- Subject to any disclaimer, ther term of this patent is extended or adjusted under 35 U.S.C. 154(b) by 211 days. --.

Signed and Sealed this

Twenty-fifth Day of October, 2005

JON W. DUDAS
*Director of the United States Patent and Trademark Office*